(12) United States Patent
Baus et al.

(10) Patent No.: US 9,194,962 B2
(45) Date of Patent: Nov. 24, 2015

(54) ENCLOSURE PRESSURE RELIEF MECHANISM INHERENT TO CASE DESIGN

(71) Applicant: General Electric Company, Schenectady, NY (US)

(72) Inventors: Edward Joseph Baus, Akron, OH (US); Joseph Paul Constant, Aurora, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 127 days.

(21) Appl. No.: 13/743,535

(22) Filed: Jan. 17, 2013

(65) Prior Publication Data
US 2014/0197323 A1  Jul. 17, 2014

(51) Int. Cl.
H01J 47/00 (2006.01)
G01T 1/185 (2006.01)
H01J 47/02 (2006.01)

(52) U.S. Cl.
CPC ........ *G01T 1/185* (2013.01); *H01J 47/02* (2013.01)

(58) Field of Classification Search
USPC ........................................................ 250/375
See application file for complete search history.

(56) References Cited

U.S. PATENT DOCUMENTS

| | | | |
|---|---|---|---|
| 2,965,759 A | | 12/1960 | Eberline |
| 3,709,239 A | * | 1/1973 | Morck, Jr. .................. 137/68.27 |
| 3,845,876 A | * | 11/1974 | Needham et al. ........ 220/203.29 |
| 5,426,305 A | * | 6/1995 | Siebentritt et al. ............ 250/374 |
| 5,718,458 A | * | 2/1998 | Erstad .............................. 285/96 |
| 2008/0169424 A1 | | 7/2008 | Beyerle |

OTHER PUBLICATIONS

Mahler et al., "A Portable Gamma-Ray Spectrometer Using Compressed Xenon", IEEE Transactions on Nuclear Science, vol. No. 45, Issue No. 3, pp. 1029-1033, Jun. 1, 1998.
"GE Energy RSS-131-ER / RSS-131 User's Manual", Nov. 1, 2008.
"GE Energy Environmental Radiation Monitor (RSS 131 ER) fact sheet", pp. 1-2, Jan. 9, 2010.
Anonymous, "Rupture Disc—Wikipedia, The Free Encyclopedia", Oct. 17, 2012.
"GE Measurement & Control RSDetection* Next Generation Reuter Stokes Environmental Radiation Monitor", Jun. 20, 2013.
PCT Search Report and Written Opinion issued in connection with corresponding Application No. PCT/US2013/074638 on Jul. 31, 2014.

* cited by examiner

*Primary Examiner* — David Porta
*Assistant Examiner* — Edwin Gunberg
(74) *Attorney, Agent, or Firm* — Cooper Legal Group, LLC

(57) ABSTRACT

A radiation detection assembly includes an ionization chamber for detecting radiation. The ionization chamber includes a volume of pressurized gas. An exterior enclosure houses the ionization chamber within an interior volume. The exterior enclosure includes a frangible section. A relief assembly defines a gas flow path from the ionization chamber to the frangible section of the exterior enclosure. The frangible section releases pressure from within the ionization chamber when the pressurized gas within the ionization chamber exceeds a predetermined pressure such that at least some of the pressurized gas flows through the relief assembly and through the frangible section of the exterior enclosure. The pressurized gas is then released to an exterior of the exterior enclosure. A method of reducing pressure within a radiation detection assembly is also provided.

20 Claims, 5 Drawing Sheets

ENCLOSURE PRESSURE RELIEF MECHANISM INHERENT TO CASE DESIGN

BACKGROUND OF THE INVENTION

1. Field of the Invention

The present invention relates generally to environmental radiation monitoring using a high pressure ionization chamber, and specifically relates to a pressure relief assembly to relieve pressure within the ionization chamber.

2. Discussion of the Prior Art

Environmental radiation monitors are known and used to detect an amount of radiation at a locality. Radiation monitors can be deployed in the field proximate to a radiation source, such as a nuclear power generation station, to monitor radiation levels.

In one type of radiation monitor, an ionization chamber, such as a high pressure ionization chamber, is utilized. The ionization chamber is sealed and filled with gas, such as nitrogen gas, argon, mixtures of other gases, etc. The gas stored within the ionization chamber is held at a higher pressure from the ambient pressure. In certain situations, pressure within the ionization chamber may increase to a level that is above a desired pressurization. Situations in which pressure buildup can occur include, for example, exposure to relatively high temperatures, a crushing force applied to the ionization chamber, etc. Accordingly, there is a need and it would be beneficial to safely relieve pressure within the ionization chamber when pressure rises above a desired pressurization.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a radiation detection assembly including an ionization chamber for detecting radiation, the ionization chamber including a volume of pressurized gas. The radiation detection assembly includes an exterior enclosure housing the ionization chamber within an interior volume. The exterior enclosure including a frangible section. A relief assembly defines a gas flow path from the ionization chamber to the frangible section of the exterior enclosure. The frangible section releases pressure from within the ionization chamber when the pressurized gas within the ionization chamber exceeds a predetermined pressure such that at least some of the pressurized gas flows through the relief assembly and through the frangible section of the exterior enclosure whereupon the pressurized gas is released to an exterior of the exterior enclosure.

In accordance with another aspect, the present invention provides a radiation detection assembly including an ionization chamber for detecting radiation. The ionization chamber includes a volume of pressurized gas. The radiation detection assembly includes an exterior enclosure housing the ionization chamber within an interior volume. The exterior enclosure includes a frangible section molded into the exterior enclosure. A relief assembly defines a gas flow path from the ionization chamber to the frangible section of the exterior enclosure. The relief assembly is positioned within the interior volume and forms a seal between each of the exterior enclosure and the ionization chamber. The frangible section releases pressure from within the ionization chamber when the pressurized gas within the ionization chamber exceeds a predetermined pressure such that at least some of the pressurized gas flows through the relief assembly and through the frangible section of the exterior enclosure whereupon the pressurized gas is released to an exterior of the exterior enclosure.

In accordance with another aspect, the present invention provides a method of reducing pressure within a radiation detection assembly. The method includes the step of providing an ionization chamber including a volume of pressurized gas. The method also includes the step of providing an exterior enclosure that houses the ionization chamber within an interior volume, the exterior enclosure including a frangible section. The method includes the step of providing a relief assembly that defines a gas flow path from the ionization chamber to the frangible section of the exterior enclosure. The method further includes the step of reducing pressure within the ionization chamber by breaching the frangible section when the pressurized gas within the ionization chamber exceeds a predetermined pressure such that the pressurized gas flows through the frangible section.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
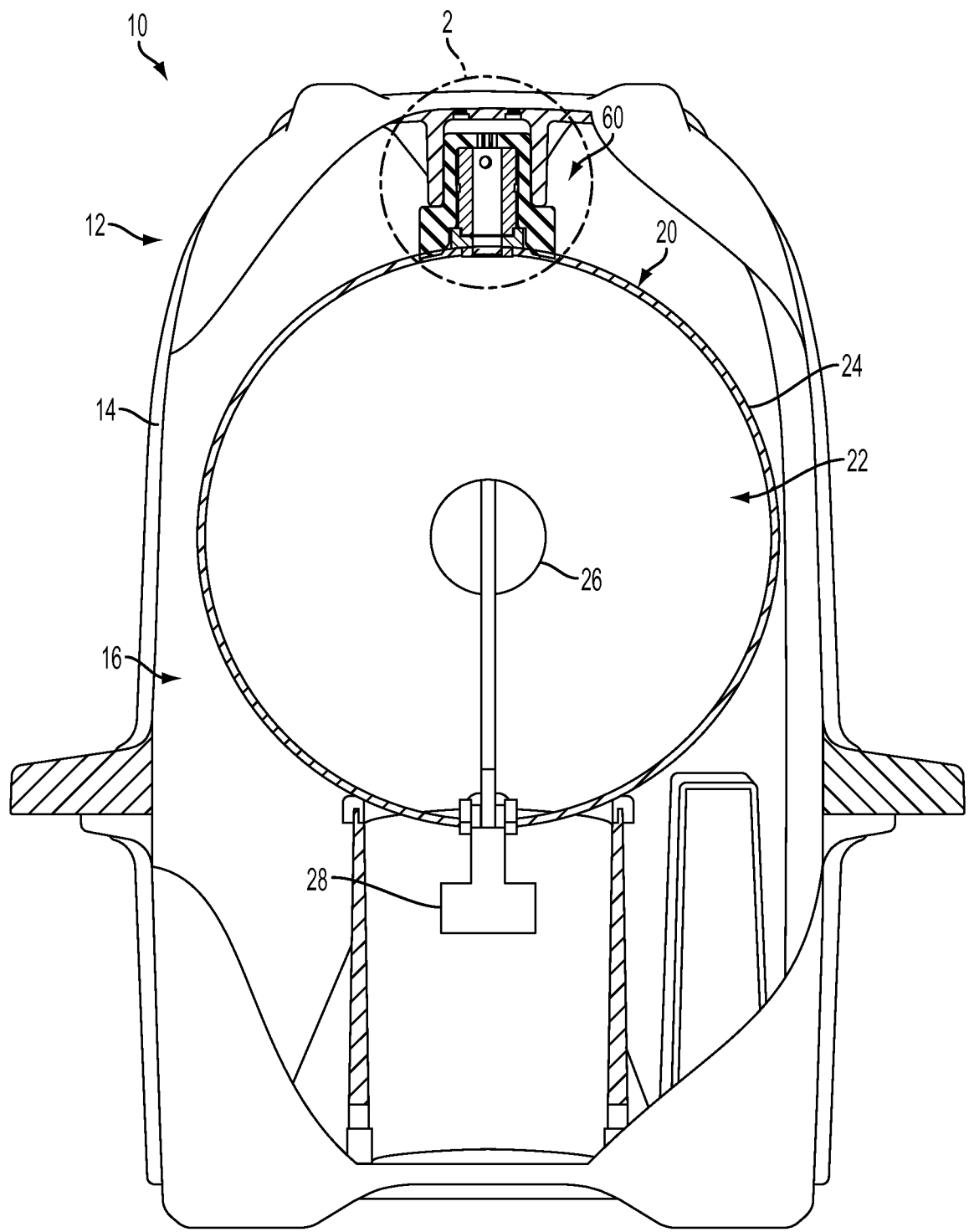
FIG. 1 is a partially torn open view of an example radiation detection assembly including an example ionization chamber in accordance with an aspect of the present invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 depicts an example embodiment of a partially torn open radiation detection assembly 10 in accordance with one aspect of the invention. It is to be appreciated that FIG. 1 merely shows one example of possible structures/configurations and that other examples are contemplated within the scope of the present invention. In general, the radiation detection assembly 10 is placed at an exterior location to perform the function of monitoring gamma radiation in the local area atmosphere. The gamma radiation may be from known or unknown sources.

The radiation detection assembly 10 includes an exterior enclosure 12. The exterior enclosure 12 includes an exterior wall 14 that bounds an interior volume 16. In this example, the exterior enclosure 12 has a generally ellipsoid/ovoid shape, though other shapes are envisioned. For instance, in other examples, the exterior enclosure 12 includes a cuboid shape or other multi-sided three dimensional shapes of varying sizes. It is to be appreciated that the exterior enclosure 12 is depicted as being partially torn open in FIG. 1 for illustrative purposes and to more clearly show the interior volume 16. In operation, however, the exterior enclosure 12 is fully enclosed such that the interior volume 16 is not normally visible. The exterior wall 14 is formed of a rigid, generally inflexible material that provides protection to the interior volume 16 from environmental effects (e.g., moisture, debris, etc.). The exterior enclosure 12 includes any number of different materials, including polymeric materials (e.g., plastics, etc.), metals, combinations of materials, or the like.

The radiation detection assembly 10 further includes an ionization chamber 20 for detecting radiation. The ionization chamber 20 is contained/housed within the interior volume 16 of the exterior enclosure 12. The ionization chamber 20 may include support structures (e.g., fasteners, screws, bolts, etc.) to secure the ionization chamber 20 with respect to the exterior enclosure 12. The ionization chamber 20 bounds a volume 22 that provides space for individual components of the ionization chamber 20. It is to be appreciated that the ionization chamber 20 in FIG. 1 is sectioned off so as to more clearly show the volume 22. In operation, however, the ionization chamber 20 will be fully enclosed such that the volume 22 is not visible.

Figure 2:
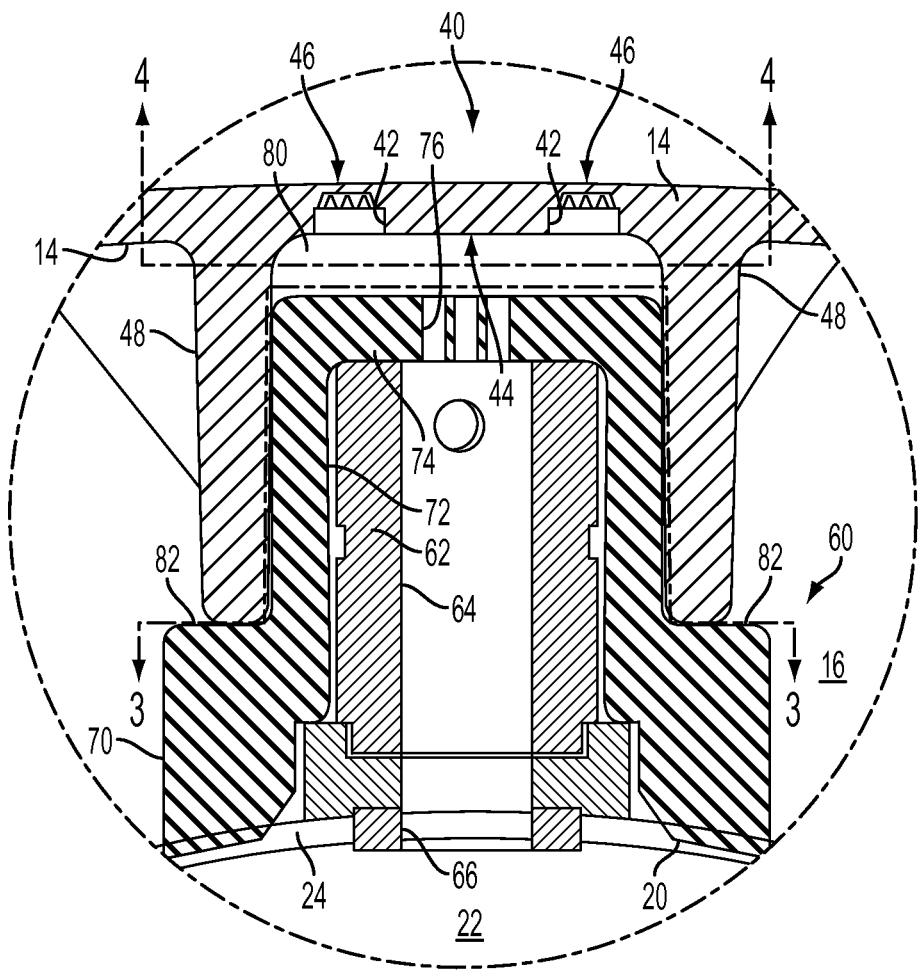
FIG. 2 is an enlarged view of a detail taken at circular section 2 of FIG. 1 of an example relief assembly.

The ionization chamber 20 is somewhat generically depicted in FIG. 2 as it is to be understood that the ionization chamber 20 includes a number of possible arrangements. In one example, the ionization chamber 20 may include a high pressure ionization chamber (HPIC). The ionization chamber 20 has a generally spherical shape, though other shapes are envisioned.

The ionization chamber 20 includes a pair of electrodes, including a cathode 24 and an anode 26. The cathode 24 bounds the volume 22. In one example, the cathode 24 is sealed and filled with a pressurized gas, such as nitrogen gas, argon, mixtures of other gases, etc. As such, this pressurized gas within the volume 22 is relatively limited from inadvertently leaking out of the ionization chamber 20. The cathode 24 can be constructed of various materials such as metals, including stainless steel, aluminum, etc.

The ionization chamber 20 further includes the anode 26 extending into the volume 22 of the cathode 24. The anode 26 can include a support member. As such, the anode 26 is not limited to the size or shape of the shown example. In this example, the anode 26 has a smaller cross-sectional size than the cathode 24 such that the anode 26 is radially spaced inward and apart from the cathode 24.

In general, the cathode 24 and anode 26 are each maintained at a voltage. Ions and electrons resulting from gamma interactions are formed in the volume 22. These ions and electrons are drawn toward the cathode 24 and anode 26, whereupon they are collected to generate a current. An amplifier 28 is electrically connected to the cathode 24 and anode 26. The amplifier 28 will receive and analyze the current to determine several measurable quantities pertaining to radiation, such as gamma dose rate, etc. The amplifier 28 can be housed within an amplifier housing or the like.

Turning now to FIG. 2, an enlarged view of a detail taken at circular section 2 of FIG. 1 is shown. In this example, the exterior enclosure 12 includes a frangible section 40. The frangible section 40 is molded/formed with the exterior wall 14 of the exterior enclosure 12. It is to be appreciated that the frangible section 40 is shown in section so as to more clearly illustrate the inner construction of portions of the frangible section 40. However, in operation, the frangible section 40 will be fully formed.

The frangible section 40 includes one or more insets 42. The insets 42 each define a hollow or substantially hollow cavity formed in an inner surface 44 of the exterior wall 14. As such, the insets 42 can receive pressurized gas from the ionization chamber 20 therewithin. The insets 42 are not limited to the size shown in FIG. 2, and in other examples, could be larger or smaller in cross-sectional size. Further, the insets 42 are not limited to the shown position, and could be located at other locations along the inner surface 44 of the exterior wall 14.

The insets 42 are bounded by a frangible wall 46. The frangible wall 46 is positioned between the insets 42 on one side, and an exterior of the radiation detection assembly 10 on an opposing second side. As such, the frangible wall 46 will at least partially limit the ingress/egress of air and/or gas between the exterior of the radiation detection assembly 10 and the insets 42. In this example, the frangible wall 46 has a smaller thickness than a thickness of the exterior wall 14 forming the exterior enclosure 12. In other examples, the frangible wall 46 is not limited to this thickness, and could include a larger or smaller thickness than as shown. By having the smaller thickness than the exterior wall 14, the frangible wall 46 is breachable and can be broken, ruptured, etc. in response to a predetermined pressure within the insets 42 and ionization chamber 20.

The frangible section 40 is bounded by a sealing projection 48. The sealing projection 48 extends from the inner surface 44 of the exterior wall 14 into the interior volume 16 towards the ionization chamber 20. The sealing projection 48 is, in the shown example, integrally formed/molded with the exterior wall 14. Of course, in further examples, the sealing projection 48 is not so limited, and instead could be separately attached with respect to the exterior wall 14. In one example, the sealing projection 48 extends generally circumferentially around the frangible section 40. In other examples, however, the sealing projection 48 is not limited to having a circular cross-section, and instead could have a square, rectangular, oval, etc. cross-section. Likewise, the sealing projection 48 can extend a longer or shorter distance into the interior volume 16 than as shown.

Referring still to FIG. 2, the radiation detection assembly 10 further includes a relief assembly 60. The relief assembly 60 is positioned within the interior volume 16 of the exterior enclosure 12 and extends between the ionization chamber 20 on one side and the frangible section 40 on an opposing second side. It is to be appreciated that the relief assembly 60 is shown in section so as to more clearly illustrate the inner construction of portions of the relief assembly 60. However, in operation, the relief assembly 60 will be fully formed.

The relief assembly 60 includes a channel structure 62. The channel structure 62 is operatively attached with respect to the cathode 24 of the ionization chamber 20. The channel structure 62 is elongated, substantially hollow, and extends from the ionization chamber 20 towards the exterior enclosure 12. In this example, the channel structure 62 has a hollow passageway 64 that extends longitudinally along the length of the channel structure 62.

The passageway 64 is in fluid communication with an opening 66 formed in the ionization chamber 20. As such, the passageway 64 can receive gas from the ionization chamber 20. The relief assembly 60 therefore defines a gas flow path from the ionization chamber 20, through the opening 66, and through the channel structure 62 to the frangible section 40. In one example, the channel structure 62 is attached to and forms a seal with respect to the ionization chamber 20, such that pressurized gas flowing through the opening 66 and into the passageway 64 is limited from escaping to the interior volume 16 of the exterior enclosure 12. To accomplish this sealing attachment between the channel structure 62 and the ionization chamber 20, any number of sealing structures (e.g., O-rings, epoxies, adhesives, etc.) can be incorporated.

The relief assembly 60 further includes a support structure 70 that supports (e.g., holds, contains, etc.) the channel structure 62. The support structure 70 is an elongated, substantially hollow structure that extends from the ionization chamber 20 towards the frangible section 40. The support structure 70 can include a number of different materials, such as an elastomeric material (e.g., rubber, etc.) or the like. In one example, the support structure 70 is capable of at least partially elastically deforming in response to a force or pressure.

The support structure 70 includes an inner chamber 72 that is substantially hollow. The inner chamber 72 extends longitudinally at least partially along the length of the support structure 70. The inner chamber 72 is sized and shaped to receive the channel structure 62 therewithin. In one example, the inner chamber 72 has a cross-sectional size and shape that substantially matches the cross-sectional size and shape of the channel structure 62, but for being slightly larger so as to receive the channel structure 62. In other examples, the inner chamber 72 includes any number of cross-sectional shapes, such as quadrilateral shapes (e.g., square, rectangular, etc.), circular shapes, oval shapes, or the like.

A support wall 74 is disposed at an end of the support structure 70. In the shown example, the support wall 74 is positioned opposite the location of attachment of the support structure 70 to the ionization chamber 20. The support wall 74 extends across the inner chamber 72 and defines a longitudinal end of the inner chamber 72. In one example, the support wall 74 includes one or more openings 76. The openings 76 extend through the support wall 74 from the inner chamber 72 to an opposing side of the support wall 74. The openings 76 are therefore in fluid communication with the inner chamber 72 and the passageway 64. As such, the openings 76 will receive gas flow from the passageway 64. The support wall 74 can include any number of openings 76, which may have larger or smaller cross-sectional size than as shown in FIG. 2.

The support wall 74 is spaced apart a distance from the exterior wall 14 and frangible section 40 so as to define a hollow chamber 80 therebetween. The hollow chamber 80 is bounded on one side by the support wall 74 and on an opposing side by the frangible section 40, including the insets 42. The hollow chamber 80 is circumferentially surrounded by the sealing projection 48. As such, the hollow chamber 80 is in fluid communication with the openings 76 and inner chamber 72, such that the hollow chamber 80 can receive gas from the ionization chamber 20.

The support structure 70 further includes a shoulder 82. The shoulder 82 extends circumferentially around an outer perimeter/surface of the support structure 70. In one example, the shoulder 82 has a larger cross-sectional size (e.g., diameter, width, etc.) than an adjacent portion of the support structure 70. In the shown example, the shoulder 82 will engage the sealing projection 48. In particular, the shoulder 82 substantially matches a shape of the sealing projection 48 such that the engagement between the shoulder 82 and sealing projection 48 will form a seal. This seal between the shoulder 82 and the sealing projection 48 will limit the ingress/egress of air/ pressurized gas between the hollow chamber 80 and the interior volume 16 of the exterior enclosure 12.

Figure 3:
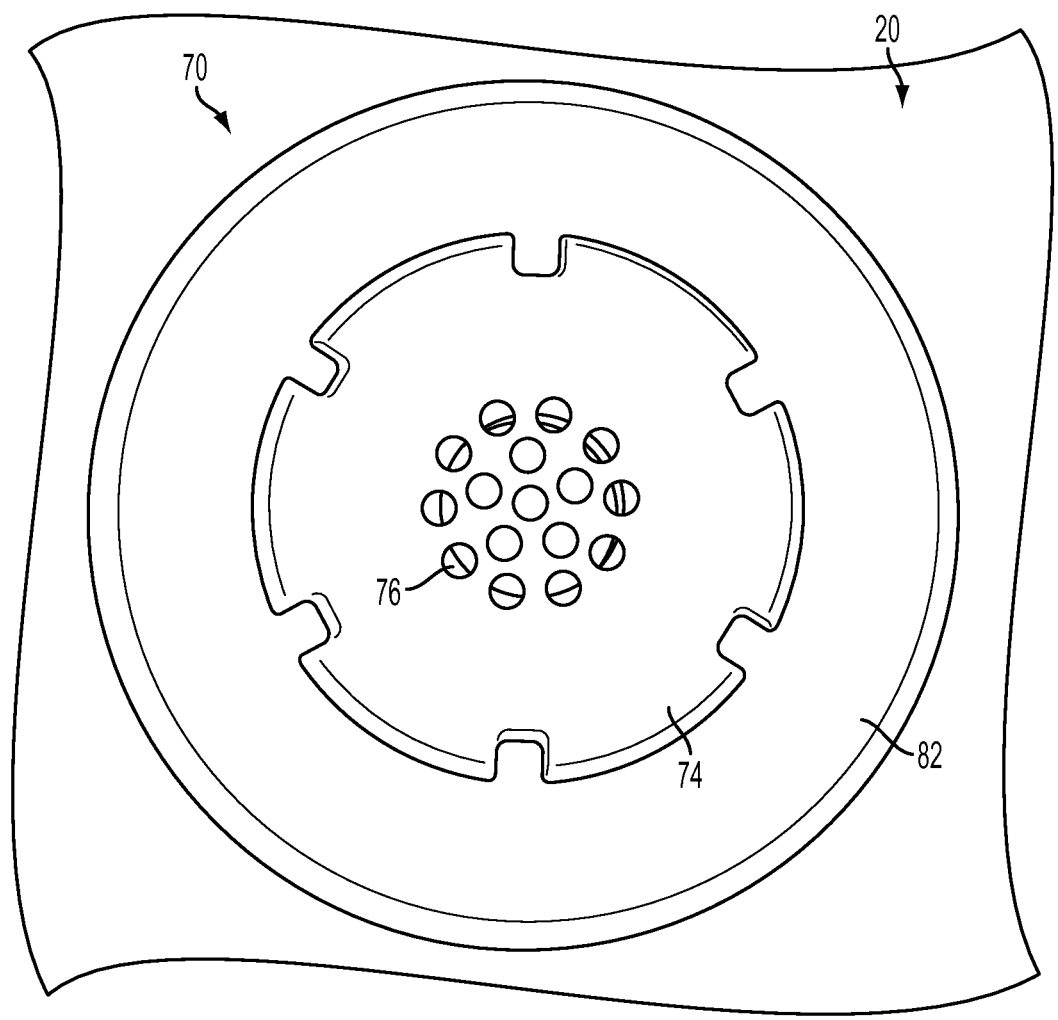
FIG. 3 is an enlarged plan view of an example support structure of the relief assembly taken along line 3-3 of FIG. 2.

Turning now to FIG. 3, an example of the support structure 70 of the relief assembly 60 along line 3-3 of FIG. 2 is shown. In this particular example, the support wall 74 is shown to include sixteen openings 76. Of course, in other examples, the support wall 74 is not so limited, and instead could include greater than or less than the number of openings 76 shown in this example. Likewise, the support wall 74 could include openings 76 that are larger or smaller than as shown.

Figure 4:
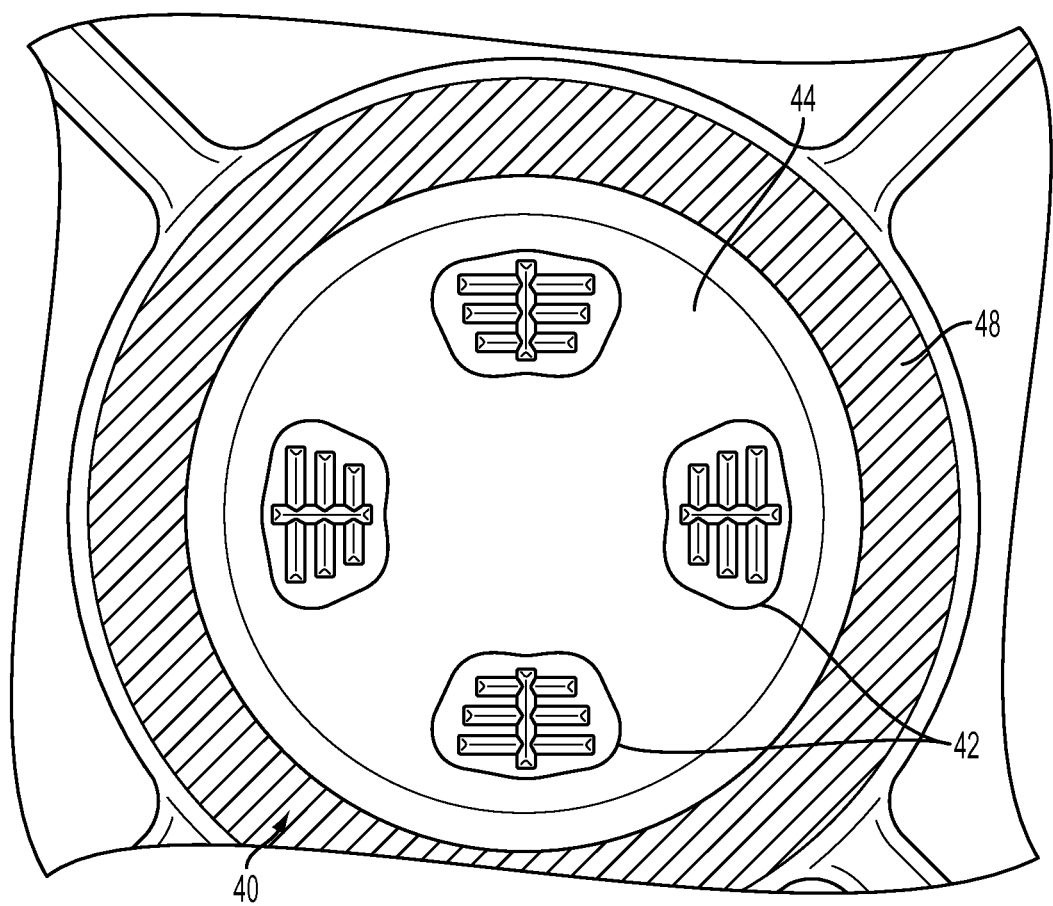
FIG. 4 is an enlarged plan view of an example frangible section of the relief assembly taken along line 4-4 of FIG. 2.

Turning now to FIG. 4, an example of the frangible section 40 is shown. In this particular example, the frangible section 40 includes four insets 42 positioned on the inner surface 44 of the exterior wall 14. Of course, in other examples, the frangible section 40 is not so limited, and instead could include greater than or less than the number of insets 42 shown in this example. Likewise, the insets 42 could be oriented in a variety of positions, and are not limited to the specific configuration shown in FIG. 4. In one example, the insets 42 could include ribbing or other patterns/projected formed within the insets 42 so as to affect the strength of the insets 42 and the frangible wall 46. The insets 42 are not limited to the specific pattern shown in FIG. 4.

Figure 5:
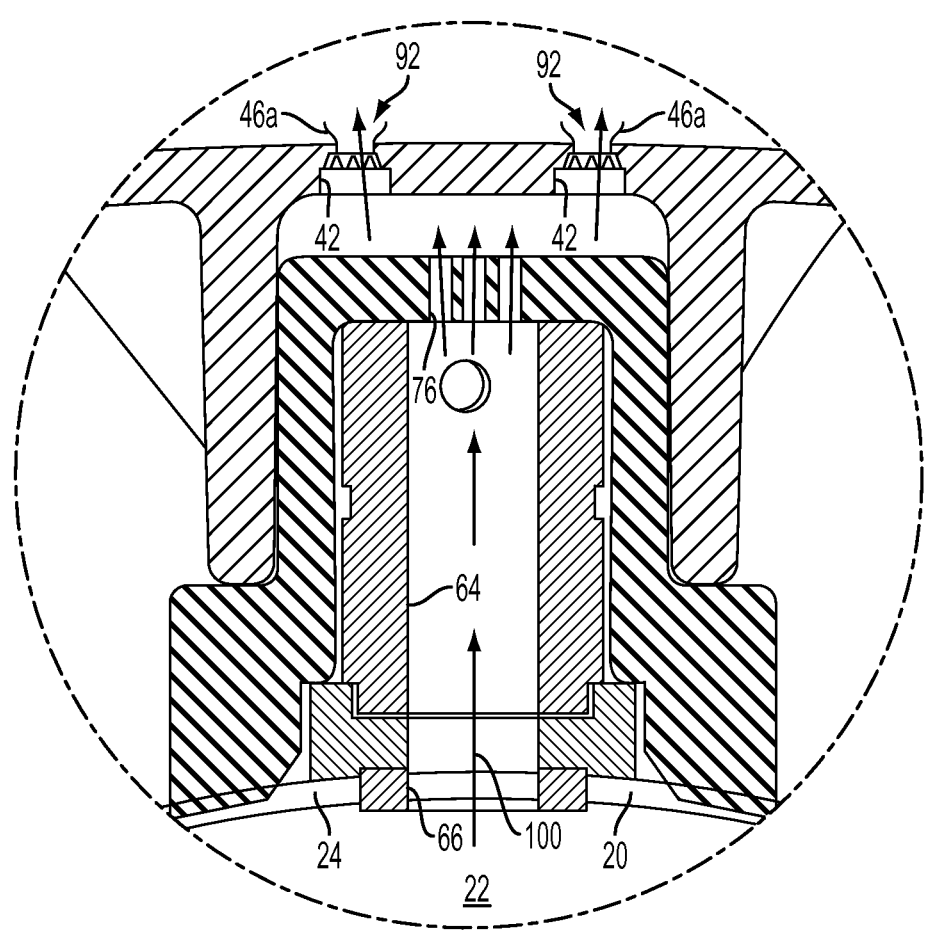
FIG. 5 is a view similar to FIG. 2 of the relief assembly and the frangible section generically depicting gas flow through the relief assembly and frangible section.

Turning now to FIG. 5, one example operation of the radiation detection assembly 10 will now be described. Initially, a quantity of gas(es), such as nitrogen, argon, etc., is added to the volume 22 of the ionization chamber 20. Ions and electrons resulting from gamma interactions are formed in the volume 22. These ions and electrons are drawn toward the cathode 24 and the anode 26, whereupon they are collected to generate a current.

The gas contained within the volume 22 is maintained under pressure. In certain examples, the pressurized gas within the volume 22 may exceed a predetermined pressure. The predetermined pressure can be exceeded, for example, in a number of ways. In one possible example, the radiation detection assembly 10 may be exposed to a relatively high temperature that causes pressure buildup within the volume 22. In another example, the pressure within the volume 22 will build up to exceed the predetermined pressure due to a crushing force applied to the ionization chamber 20. Of course, pressure buildup is not so limited to these situations, as other ways for pressure to increase can occur.

After reaching the predetermined pressure, the pressurized gas within the ionization chamber 20 will be evacuated through the relief assembly 60 and through the frangible section 40 to an exterior of the radiation detection assembly 10. In particular, gas flow 100 (shown generically/schematically in FIG. 5 with arrowheads) will pass through the opening 66 in the ionization chamber 20, through the passageway 64 and through the openings 76 of the support structure 70. The pressurized gas that exceeds the predetermined pressure creates a large enough force upon the frangible wall 46 to cause the frangible wall 46 to be breached (e.g., break, rupture, etc.). The frangible wall 46 is displayed somewhat generically/schematically as a breached wall 46a in FIG. 5. Accordingly, the gas flow 100 will pass through the insets 42 and exit through a breach opening 92 in the frangible section 40. The gas flow 100 passing through the breach opening 92 is released to an exterior of the exterior enclosure 12, thus reducing the pressure within the ionization chamber 20. At this point, the exterior enclosure 12, including the breached wall 46a can be removed from the ionization chamber 20 and replaced with a new exterior enclosure 12 having the frangible wall 46 that is unbreached.

It is to be appreciated that the predetermined pressure within the ionization chamber 20 that causes a breach of the frangible wall 46 can include any number of values. In one possible example, the predetermined pressure within the ionization chamber 20 can be about 2.75 megapascals (MPa) (~400 pounds/in2 (PSI)). Accordingly, in such an example, the frangible wall 46 is breached and releases pressure from within the ionization chamber when the pressure within the ionization chamber 20 and acting upon frangible wall 46 is at or above yield stress of the material [155 MPa (22,500 PSI)]. In such an example, the pressurized gas exiting through the breached wall 46a is at approximately 2.75 MPa (~400 PSI). Of course, the radiation detection assembly 10 is not limited to these values, as a wide range of predetermined pressures are envisioned. In another example, the size (e.g., thickness, diameter, etc.) of the frangible wall 46 could be altered so as to increase or decrease the allowable predetermined pressure in the ionization chamber 20 before the frangible wall 46 will be breached.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A radiation detection assembly including:
   an ionization chamber for detecting radiation, the ionization chamber including a volume of pressurized gas;
   an exterior enclosure housing the ionization chamber within an interior volume, the exterior enclosure including a frangible section; and
   a relief assembly defining a gas flow path from the ionization chamber to the frangible section of the exterior enclosure, wherein the frangible section releases pressure from within the ionization chamber when the pressurized gas within the ionization chamber exceeds a predetermined pressure such that at least some of the pressurized gas flows through the relief assembly and through the frangible section of the exterior enclosure whereupon the pressurized gas is released to an exterior of the exterior enclosure.

2. The radiation detection assembly of claim 1, wherein the frangible section is molded into the exterior enclosure.

3. The radiation detection assembly of claim 1, wherein the relief assembly is positioned within the interior volume of the exterior enclosure.

4. The radiation detection assembly of claim 1, wherein the relief assembly is sealed with respect to the exterior enclosure such that the pressurized gas is limited from flowing into the interior volume of the exterior enclosure.

5. The radiation detection assembly of claim 4, wherein the relief assembly is sealed with respect to the ionization chamber.

6. The radiation detection assembly of claim 1, wherein the exterior enclosure includes a sealing projection that extends inwardly from an inner surface of the exterior enclosure into the interior volume.

7. The radiation detection assembly of claim 6, wherein the relief assembly includes a shoulder disposed at an outer surface of the relief assembly.

8. The radiation detection assembly of claim 7, wherein the sealing projection engages the shoulder and forms a seal with respect to the shoulder.

9. The radiation detection assembly of claim 8, wherein the shoulder includes an elastically deformable material.

10. A radiation detection assembly including:
    an ionization chamber for detecting radiation, the ionization chamber including a volume of pressurized gas;
    an exterior enclosure housing the ionization chamber within an interior volume, the exterior enclosure including a frangible section molded into the exterior enclosure; and
    a relief assembly defining a gas flow path from the ionization chamber to the frangible section of the exterior enclosure, the relief assembly being positioned within the interior volume and forming a seal between each of the exterior enclosure and the ionization chamber, wherein the frangible section releases pressure from within the ionization chamber when the pressurized gas within the ionization chamber exceeds a predetermined pressure such that at least some of the pressurized gas flows through the relief assembly and through the frangible section of the exterior enclosure whereupon the pressurized gas is released to an exterior of the exterior enclosure.

11. The radiation detection assembly of claim 10, wherein the exterior enclosure includes a sealing projection that extends inwardly from an inner surface of the exterior enclosure into the interior volume.

12. The radiation detection assembly of claim 11, wherein the relief assembly includes a shoulder disposed at an outer surface of the relief assembly.

13. The radiation detection assembly of claim 12, wherein the sealing projection engages the shoulder and forms a seal with respect to the shoulder.

14. The radiation detection assembly of claim 13, wherein the shoulder includes an elastically deformable material.

15. The radiation detection assembly of claim 11, wherein the frangible section includes a plurality of insets that project into a wall of the exterior enclosure.

16. The radiation detection assembly of claim 15, wherein the insets are separated from the exterior of the exterior enclosure by a frangible wall.

17. A method of reducing pressure within a radiation detection assembly, the method including the steps of:
    providing an ionization chamber including a volume of pressurized gas;
    providing an exterior enclosure that houses the ionization chamber within an interior volume, the exterior enclosure including a frangible section;
    providing a relief assembly that defines a gas flow path from the ionization chamber to the frangible section of the exterior enclosure; and
    reducing pressure within the ionization chamber by breaching the frangible section when the pressurized gas within the ionization chamber exceeds a predetermined pressure such that the pressurized gas flows through the frangible section.

18. The method of claim 17, wherein the frangible section is molded into the exterior enclosure.

19. The method of claim 17, wherein prior to the step of reducing pressure within the ionization chamber, the frangible section is unbroken and prevents the passage of air from an exterior of the exterior enclosure through the frangible section.

20. The method of claim 17, wherein the frangible section includes a frangible wall that has a thickness that is less than a thickness of a wall of the exterior enclosure.

* * * * *